(12) United States Patent
Sun (10) Patent No.: US 10,721,694 B2
(45) Date of Patent: Jul. 21, 2020

(54) METHODS AND ELECTRONIC DEVICES FOR CONTROLLING TRANSMISSION POWER

(71) Applicant: MEDIATEK INC., Hsin-Chu (TW)

(72) Inventor: Juei-Ting Sun, Kaohsiung (TW)

(73) Assignee: MEDIATEK INC., Hsinchu (TW)

( * ) Notice: Subject to any disclaimer, the term of this patent is extended or adjusted under 35 U.S.C. 154(b) by 29 days.

(21) Appl. No.: 16/152,579

(22) Filed: Oct. 5, 2018

(65) Prior Publication Data

US 2019/0045463 A1 Feb. 7, 2019

Related U.S. Application Data

(63) Continuation-in-part of application No. 14/938,110, filed on Nov. 11, 2015, now abandoned.

(60) Provisional application No. 62/162,932, filed on May 18, 2015.

(51) Int. Cl.
| | |
|---|---|
| *H04W 4/80* | (2018.01) |
| *H04W 52/46* | (2009.01) |
| *H04W 52/38* | (2009.01) |
| *H04W 16/14* | (2009.01) |
| *H04W 52/54* | (2009.01) |

(52) U.S. Cl.
CPC ......... *H04W 52/383* (2013.01); *H04W 16/14* (2013.01); *H04W 52/54* (2013.01); *H04W 4/80* (2018.02); *H04W 52/46* (2013.01)

(58) Field of Classification Search
CPC .... H04B 1/715; H04W 52/383; H04W 72/02; H04W 88/06
See application file for complete search history.

(56) References Cited

U.S. PATENT DOCUMENTS

| | | |
|---|---|---|
| 2009/0117860 A1 | 5/2009 | Kimura |
| 2011/0195741 A1 | 8/2011 | Kim et al. |
| 2011/0263212 A1 | 10/2011 | Yeh et al. |
| 2012/0071106 A1 | 3/2012 | Kadous et al. |
| 2012/0213116 A1 | 8/2012 | Koo et al. |
| 2012/0329515 A1 | 12/2012 | Husted et al. |
| 2014/0056288 A1* | 2/2014 | Wyper ............ H04W 88/06 370/336 |
| 2015/0133185 A1* | 5/2015 | Chen ............ H04W 72/1215 455/552.1 |
| 2015/0146548 A1 | 5/2015 | Wang |

(Continued)

FOREIGN PATENT DOCUMENTS

| | | |
|---|---|---|
| CN | 103119992 A | 5/2013 |
| CN | 103430618 A | 12/2013 |

*Primary Examiner* — Iqbal Zaidi
(74) *Attorney, Agent, or Firm* — McClure, Qualey & Rodack, LLP (57) ABSTRACT

A method and an electronic device for controlling transmission power are provided. The method includes the steps of determining an overlapping level between a channel used by a first wireless module and a channel mask used by a second wireless module; determining whether to adjust the transmission power of the first wireless module according to the overlapping level, wherein the first wireless module complies with a first wireless technology, and the second wireless module complies with a second wireless technology, and the second wireless module is coexistent with the first wireless transmission technology in an overlapping hand.

9 Claims, 5 Drawing Sheets

(56) References Cited

U.S. PATENT DOCUMENTS

| | | |
|---|---|---|
| 2015/0365889 A1 | 12/2015 | Rajendran et al. |
| 2016/0191181 A1* | 6/2016 | Bailey .................... H04H 20/86 381/77 |
| 2016/0338121 A1 | 11/2016 | Wieffeldt et al. |
| 2017/0086076 A1 | 3/2017 | Sadek et al. |

* cited by examiner

METHODS AND ELECTRONIC DEVICES FOR CONTROLLING TRANSMISSION POWER

CROSS REFERENCE TO RELATED APPLICATIONS

This Application is a Continuation-In-Part of U.S. patent application Ser. No. 14/938,110, filed on Nov. 11, 2015, which claims priority of U.S. Provisional Patent Application No. 62/162,932, filed on May 18, 2015. The entirety of which is incorporated by reference herein.

BACKGROUND OF THE INVENTION

Field of the Invention

The invention generally relates to the control of transmission power, and more particularly to a method for controlling transmission power when a first wireless transmission technology is coexistent with a second wireless transmission technology in the same band.

Description of the Related Art

Recently, because of rapid developments in communications technology, electronic devices such as smartphones, personal digital assistants, and tablet PCs have become available that are more and more technically advanced and multifunctional. Due to the increased convenience and functionality of such devices, these devices have become necessities of modern life.

A user may utilize the electrical devices or mobile devices to transmit messages and data using wireless transmission technologies, such as infrared rays, Bluetooth, 802.11 (Wi-Fi), ZigBee, Ultra Wide Band (UWB), Near Field Communication (NFC), etc. . . .

However, when more than one wireless transmission technology is coexistent in the same band, the transmission for different transmission technologies may be influenced by each other, and the throughput may degrade, or the link may disconnect. For example, Bluetooth and Wi-Fi both use the channels of the 2.4 G Industrial Scientific Medical (ISM) band, and therefore Bluetooth and Wi-Fi may be coexistent in the 2.4 G ISM band. Therefore, the Wi-Fi signal may be influenced by the Bluetooth signal. Although Bluetooth has an Adaptive Frequency Hopping (AFH) mechanism to mask channels which are used by the Wi-Fi signals to avoid signal collision. However, when the isolation between Wi-Fi antenna and the Bluetooth antenna is too small to isolate the signal strength of the Wi-Fi and Bluetooth signals, the Wi-Fi signal still may be influenced by the Bluetooth signal even though the AFH mechanism is being used.

BRIEF SUMMARY OF THE INVENTION

Methods and electronic devices for controlling transmission power, which can overcome the problems mentioned above.

An embodiment of the invention provides a method for controlling transmission power. The method comprises the steps of determining an overlapping level between a channel used by a first wireless module and a channel mask used by a second wireless module; and determining whether to adjust the transmission power of the first wireless module according to the overlapping level, wherein the first wireless module complies with a first wireless technology, and the second wireless module complies with a second wireless technology, and the second wireless module is coexistent with the first wireless transmission technology in an overlapping band.

An embodiment of the invention provides an electronic device. The electronic device comprises a first wireless module and a processor. The first wireless module is configured to transmit data. The processor is configured to determine an overlapping level between a channel used by the first wireless module and a channel mask used by a second wireless module and determine whether to adjust the transmission power of the first wireless module according to the overlapping level. The first wireless module complies with a first wireless technology, and the second wireless module complies with a second wireless technology, and the second wireless module is coexistent with the first wireless transmission technology in an overlapping band.

Other aspects and features of the invention will become apparent to those with ordinary skill in the art upon review of the following descriptions of specific embodiments of methods and electronic devices.

BRIEF DESCRIPTION OF THE DRAWINGS

The invention will become mote fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
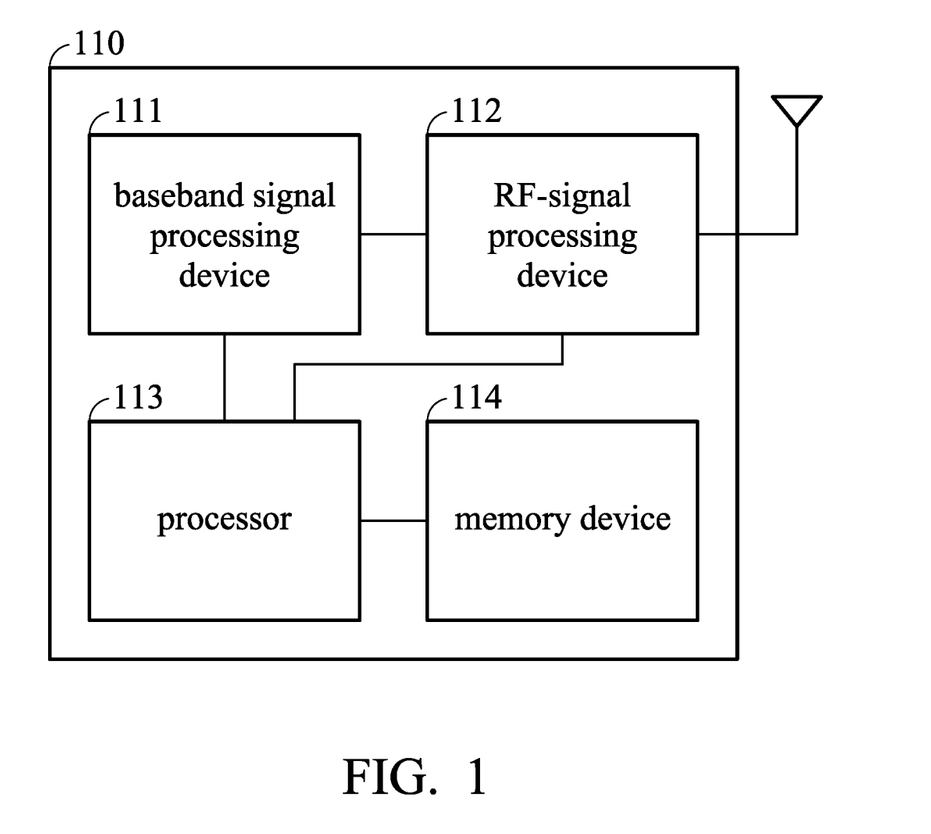
FIG. 1 is a block diagram of an electronic device 110 according to an embodiment of the invention.

FIG. 1 is a block diagram of an electronic device 110 according to an embodiment of the invention. The electronic device 110 may be a mobile communications device, such as a cellular phone, a smartphone modem processor, a data card, a laptop stick, a mobile hotspot, a USB modem, a tablet, and others.

The electronic device 110 may comprise at least a baseband signal processing device 111, a radio frequency (RF) signal processing device 112, and a processor 113. Note that, in order to clarify the concept of the invention, FIG. 1 presents a simplified block diagram in which only the elements relevant to the invention are shown. However, the invention should not be limited to what is shown in FIG. 1.

The RF signal processing device 112 may comprise one or more wireless modules for different wireless transmission technologies, such as Bluetooth, Bluetooth Low Energy (BLE), ZigBee, Wi-Fi and so on. Each wireless module may include one or more antennas. The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied with specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

According to an embodiment of the invention, the RF signal processing device 112 and the baseband signal processing device 111 may be collectively regarded as a radio module capable of communicating with a wireless network to provide wireless communications services in compliance with a predetermined Radio Access Technology (RAT).

In an embodiment of the invention, the electronic device 110 may further comprise a memory device 114. The memory device 114 may store the software and firmware program codes, system data, user data, etc. of the UE 110. The memory device 114 may be a volatile memory, e.g. a Random Access Memory (RAM), or a non-volatile memory, e.g. a flash memory, Read-Only Memory (ROM), or hard disk, or any combination thereof.

In an embodiment of the invention, a first wireless module of the electronic device 110 supports a first wireless transmission technology, such as Bluetooth, and the first wireless module is configured to transmit data by the first wireless transmission technology. Note that, in order to clarify the embodiments of the invention, the first wireless transmission technology will be regarded as Bluetooth, i.e. the first wireless module can be regarded as a Bluetooth module. However, it should be understood that the invention is not limited thereto, i.e. the first wireless transmission technology may be another wireless transmission technology.

In an embodiment of the invention, when the first wireless module is utilized to transmit data, a second wireless transmission technology corresponding to a second wireless module may be coexistent with the first wireless transmission technology in the same band. For example, Bluetooth and Wi-Fi both use the channels of the 2.4 G Industrial Scientific Medical (ISM) band, and therefore Bluetooth and Wi-Fi may be coexistent in the 2.4 G ISM band. In an embodiment of the invention, the second wireless module may be allocated in the electronic device 110 i.e. the first wireless module and the second wireless module are combined in the electronic device 110. In an embodiment of the invention, the second wireless module may be allocated in another electronic device.

In an embodiment of the invention, the second wireless module may support the second wireless transmission technology, such as Wi-Fi, and the second wireless module is configured to transmit data by second wireless transmission technology. Note that, in order to clarify the embodiments of the invention, the second wireless transmission technology will be regarded as Wi-Fi, i.e. the second wireless module can be regarded as a Wi-Fi module. However, it should be understood that the invention is not limited thereto, i.e. the second wireless transmission technology may be other wireless transmission technology.

When the second wireless transmission technology corresponding to the second wireless module is coexistent with the first wireless transmission technology in the same band, the processor 113 will determine whether to adjust the transmission power of the first wireless module to avoid influencing the transmission of the second wireless module. In an embodiment of the invention, the transmission power of the first wireless module is pre-separated into different power levels, e.g. normal transmission power or smaller transmission power. The different power levels may be set according to different factors, such as traffics, distance between a channel utilized for the first wireless transmission technology and a channel utilized for the second wireless transmission technology, an overlapping level between a channel used by the first wireless module and a channel mask used by the second wireless module, and so on, and different thresholds for these factors are also be set. The channel mask can be the transmit spectrum mask defined in IEEE 802.11 Standard or any applicable standards. In an embodiment of the present invention, the overlapping level can be a distance between the frequency center of the channel used by the first wireless module and the frequency center defined by the channel mask used by the second wireless module. In another embodiment of the present invention, the overlapping level can be a percentage of the frequency bandwidth defined by the channel mask used by the second wireless module that is overlapped by the channel used by the first wireless module. In an embodiment of the invention, the thresholds (e.g. first threshold and second threshold in the descriptions below), which are utilized to separate the power levels are set according to the isolation between first wireless module and second wireless module.

In an embodiment of the invention, the transmission power is separated into different power levels according to a linear proportion. For example, the transmission power and the distance between a channel utilized for the first wireless transmission technology and a channel utilized for the second wireless transmission technology may be in a linear proportional relationship. In yet another embodiment of the invention, the transmission power and the overlapping level between a channel used by the first wireless module and a channel mask used by the second wireless module may be in a linear proportional relationship.

Figure 2:
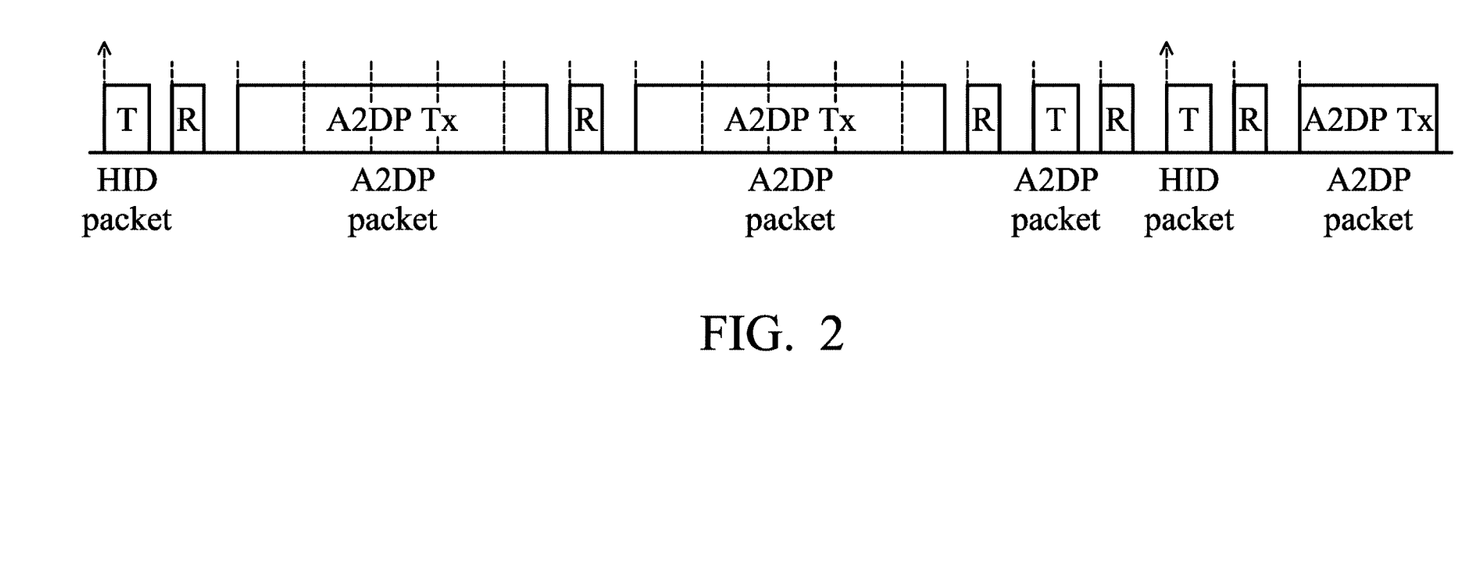
FIG. 2 is a schematic diagram of traffic for an HID profile and A2DP according to an embodiment of the invention.

In an embodiment of the invention, the processor 113 determines whether to adjust the transmission power of the first wireless module according to traffic of the first wireless module. Taking Bluetooth technology for example, many Bluetooth profiles are specified, such as Human Interface Device (HID) Profile, Audio Video Remote Control Profile (AVRCP), Advance Audio Distribution Profile (A2DP), File Transfer Profile (FTP), Object Push Profile (OPP), Basic Imaging Profile (BIP), Cordless Telephony Profile (CTP), and so on. Each Bluetooth profile may correspond to different traffic. For example, as shown in FIG. 2, the HID profile (i.e. T) may have light traffic and short packet and the A2DP (i.e. A2DP Tx) may have heavy traffic and long packet, wherein R means receiving the acknowledgement (ACK) signal for each of the HID profile and A2DP.

Therefore, if the traffic corresponding to the first wireless module is higher than a first threshold, the processor 113 may reduce the transmission power of the first wireless module to a lower level for reducing the possible influence between the Bluetooth (i.e. first wireless transmission technology) and Wi-Fi (i.e. second wireless transmission technology). If the traffic corresponding to the first wireless module is not higher than a first threshold, the processor 113 may maintain the transmission power of the first wireless module at a normal level to maintain the original transmission of the first wireless module. For example, if the first wireless module is configure to transmit the data belonging to the HID profile, the traffic corresponding to the first wireless module may be not higher than the first threshold, and therefore, the processor 113 may maintain the transmission power of the first wireless module at a normal level. If the first wireless module is configure to transmit the data belonging to the A2DP, the traffic corresponding to the first wireless module may be higher than the first threshold, and therefore, the processor 113 may reduce the transmission power of the first wireless module to a lower level. In an embodiment of the invention, the first threshold is a traffic value.

In another embodiment of the invention, the processor may determine whether the distance between a channel utilized for the first wireless transmission technology and a channel utilized for the second wireless transmission technology is shorter than a second threshold, or an overlapping level between a channel used by the first wireless module and a channel mask used by the second wireless module. If the distance between the channel utilized for the first wireless transmission technology and the channel utilized for the second wireless transmission technology is shorter than the second threshold, or if the overlapping level between a channel used by the first wireless module and a channel mask used by the second wireless module is larger than a threshold, the processor 113 may reduce the transmission power of the first wireless module to a lower level. If the distance between a channel utilized for the first wireless transmission technology and a channel utilized for the second wireless transmission technology is not shorter than a second threshold, or if the overlapping level between a channel used by the first wireless module and a channel ask used by the second wireless module is not larger than a threshold, the processor 113 may maintain the transmission power of the first wireless module at a normal level.

Figure 3:
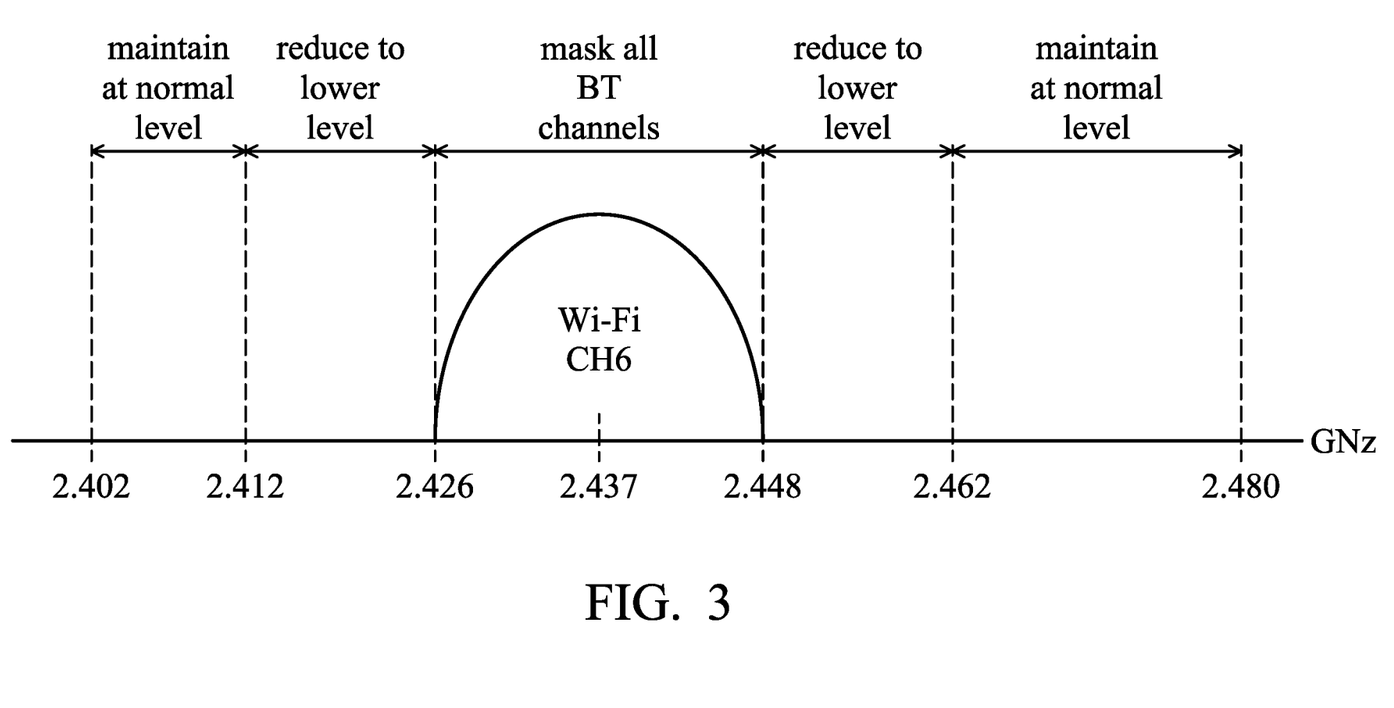
FIG. 3 is a schematic diagram of the channel distribution according to an embodiment of the invention.

FIG. 3 is a schematic diagram of the channel distribution according to an embodiment of the invention. As shown in FIG. 3, the Wi-Fi transmission is performed in the CH 6 (from 2.426 GHz to 2.448 GHz). The CH 6 of Wi-Fi may mask all Bluetooth channels. In addition, when the channel utilized for Bluetooth (one of the Bluetooth channels in 2.448 GHz to 2.462 GHz or in 2.412 GHz to 2.426 GHz) is close to the channel utilized for Wi-Fi (i.e. shorter than the second threshold), the processor 113 may gradually reduce the transmission power of the first wireless module to a lower level. That is to say, when the channel utilized for Bluetooth is closer to the CH 6 of Wi-Fi, the transmission power of the first wireless module becomes lower. And when the channel utilized for Bluetooth (one of the Bluetooth channels in 2.402 GHz to 2.412 GHz or in 2.462 GHz to 2.480 GHz) is not close to the channel utilized for Wi-Fi (i.e. not shorter than the second threshold), the processor 113 may maintain the transmission power of the first wireless module at a normal level. Note that FIG. 3 is utilized to clarify the embodiments of the invention. However, it should be understood that the invention is not limited thereto.

Figure 4:
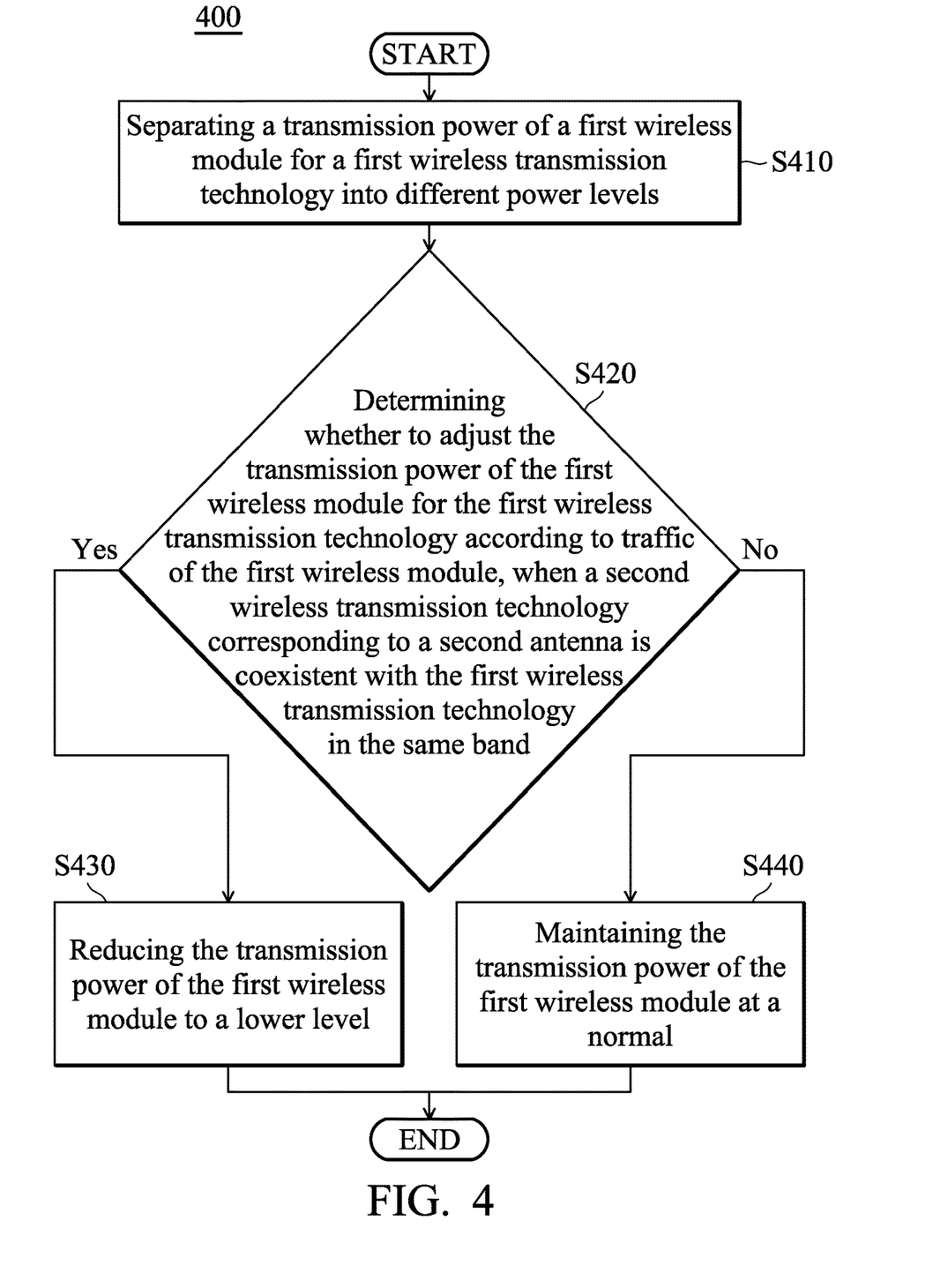
FIG. 4 is a flow chart 400 illustrating the method for controlling transmission power according to an embodiment of the invention.

FIG. 4 is a flow chart 400 illustrating the method for controlling transmission power according to an embodiment of the invention. The method 400 can be applied to the electronic device 110. First, in step S410, the electronic device 110 separates a transmission power of a first wireless module for a first wireless transmission technology into different power levels. In step S420, the electronic device 110 determines whether to adjust the transmission power of the first wireless module for the first wireless transmission technology according to traffic of the first wireless module, when a second wireless transmission technology corresponding to a second wireless module is coexistent with the first wireless transmission technology in the same band. If the traffic corresponding to the first wireless module is higher than a first threshold, step S430 is performed. In step S430, the electronic device 110 reduces the transmission power of the first wireless module from a normal power to a lower level. If the traffic corresponding to the first wireless module is not higher than a first threshold, step S440 is performed. In step S440, the electronic device 110 maintains the transmission power of the first wireless module at the normal level.

Figure 5:
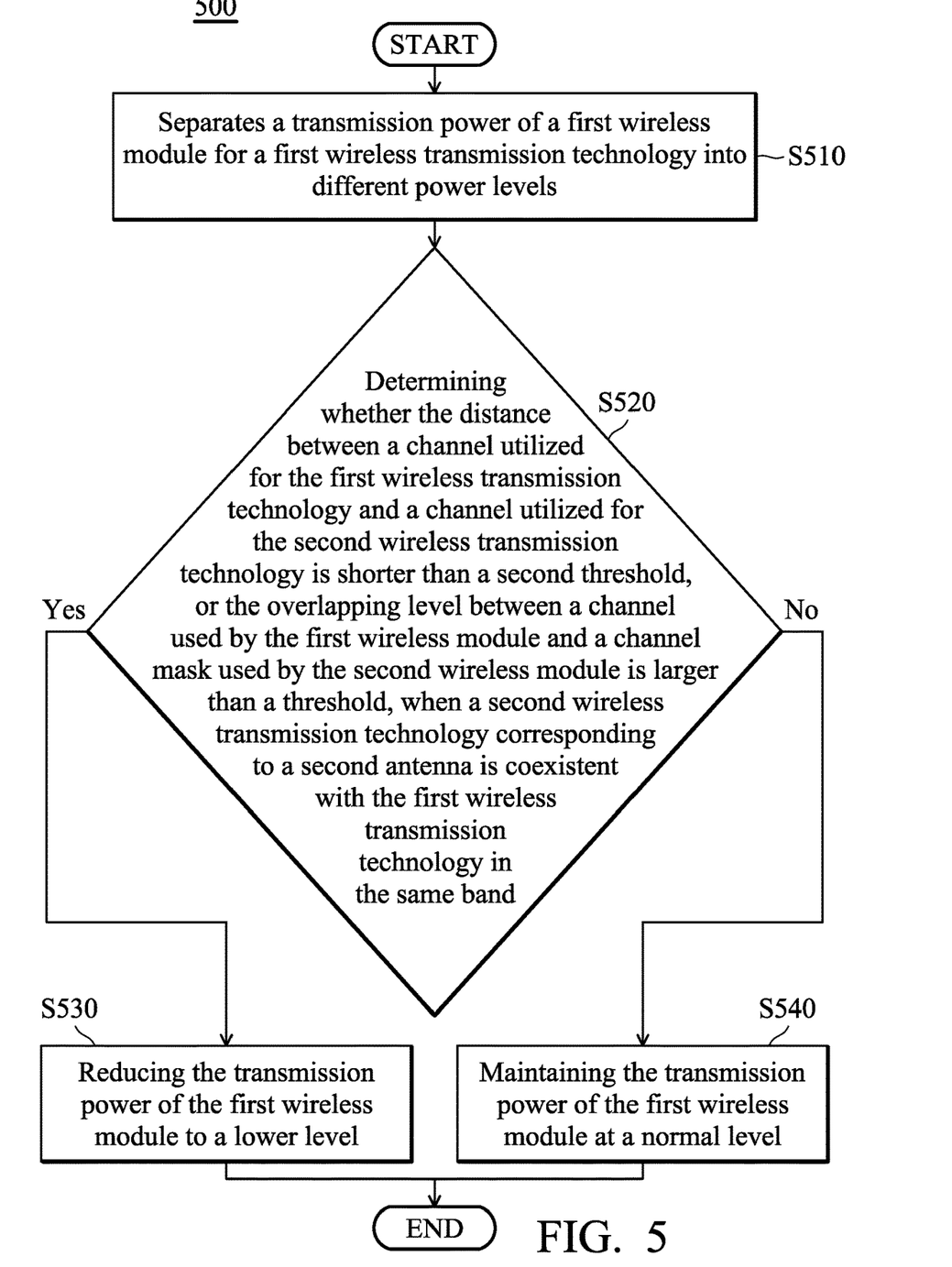
FIG. 5 is a flow chart 500 illustrating the method for controlling transmission power according to an embodiment of the invention.

FIG. 5 is a flow chart 500 illustrating the method for controlling transmission power according to an embodiment of the invention. The method 500 can be applied to the electronic device 110. First, in step S510, the electronic device 110 separates a transmission power of a first wireless module for a first wireless transmission technology into different power levels. In step S520, the electronic device 110 determines whether the distance between a channel utilized for the first wireless transmission technology and a channel utilized for the second wireless transmission technology is shorter than a second threshold, or the overlapping level between a channel used by the first wireless module and a channel mask used by the second wireless module is larger than a threshold, when a second wireless transmission technology corresponding to a second wireless module is coexistent with the first wireless transmission technology in the same band. If the distance between the channel utilized for the first wireless transmission technology and the channel utilized for the second wireless transmission technology is shorter than the second threshold, or the overlapping level between a channel used by the first wireless module and a channel mask used by the second wireless module is larger than a threshold, step S530 is performed. In step S530, the electronic device 110 reduces the transmission power of the first wireless module from a normal power to a lower level. If the distance between a channel utilized for the first wireless transmission technology and a channel utilized for the second wireless transmission technology is not shorter than a second threshold, or the overlapping level between a channel used by the first wireless module and a channel mask used by the second wireless module is not larger than a threshold, step S340 is performed. In step S540, the electronic device 110 maintains the transmission power of the first wireless module at the normal level.

In an embodiment of the invention, in the above methods, the first wireless module and the second wireless module are combined in the same device. In another embodiment of the invention, in the above methods, the first wireless module and the second wireless module are allocated in different devices.

In the methods of the invention, the transmission power corresponding to the first wireless module is separated into different power levels. When a first wireless transmission technology corresponding to the first wireless module is coexistent with the another wireless transmission technology corresponding to another wireless module in the same band, if the traffic corresponding to the first wireless module is heavy, or if the channel utilized by the first wireless module is close to the channel utilized by another wireless module, the transmission power corresponding to the first wireless module will be reduced to avoid the signals of different first wireless transmission technologies influencing each other.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention. Furthermore, the particular features, structures, or characteristics may be combined in any suitable manner in one or more embodiments. Various additional layers and/or structures may be included and/or described features may be omitted in other embodiments.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for controlling transmission power:
   determining, by a processor of an electronic device, an overlapping level between a channel used by a first wireless module and a channel mask used by a second wireless module;
   determining, by the processor, whether to adjust the transmission power of the first wireless module according to the overlapping level;
   reducing, by the processor, the transmission power of the first wireless module from a normal power to a lower level, in response to the overlapping level being higher than a threshold; and
   maintaining, by the processor, the transmission power of the first wireless module at the normal level, in response to the overlapping level being not shorter than the threshold,
   wherein the first wireless module complies with a first wireless technology, and the second wireless module complies with a second wireless technology, and the second wireless module is coexistent with the first wireless transmission technology in an overlapping band.

2. The method of claim 1, wherein the first wireless module and the second wireless module are combined in the same device.

3. The method of claim 1, wherein the first wireless module and the second wireless module are allocated in different devices.

4. The method of claim 1, wherein the transmission power is separated into different power levels according to a linear proportion.

5. An electronic device, comprising:
   a first wireless module, configured to transmit data; and;
   a processor, configured to determine an overlapping level between a channel used by the first wireless module and a channel mask used by a second wireless module and determine whether to adjust the transmission power of the first wireless module according to the overlapping level, wherein the processor is coupled to the first wireless module and the second wireless module,
   wherein the first wireless module complies with a first wireless technology, and the second wireless module complies with a second wireless technology, and the second wireless module is coexistent with the first wireless transmission technology in an overlapping band,
   wherein the processor reduces the transmission power of the first wireless module from a normal power to a lower level, in response to the overlapping level being higher than a first threshold,
   wherein the processor maintains the transmission power of the first wireless module at the normal level, in response to the overlapping level being not higher than the first threshold.

6. The electronic device of claim 5, wherein the processor determines whether a distance between a channel utilized for the first wireless transmission technology and a channel utilized for the second wireless transmission technology is shorter than a second threshold.

7. The electronic device of claim 5, wherein the first wireless module and the second wireless module are combined in the electronic device.

8. The electronic device of claim 5, wherein the second wireless module is allocated in a second electronic device.

9. The electronic device of claim 5, wherein the transmission power is separated into different power levels according to a linear proportion.

\* \* \* \* \*